(12) United States Patent
Wiseman et al.

(10) Patent No.: US 7,216,369 B2
(45) Date of Patent: May 8, 2007

(54) TRUSTED PLATFORM APPARATUS, SYSTEM, AND METHOD

(75) Inventors: Willard M. Wiseman, Vernonia, OR (US); David W. Grawrock, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 10/185,391

(22) Filed: Jun. 28, 2002

(65) Prior Publication Data

US 2004/0003288 A1    Jan. 1, 2004

(51) Int. Cl.
*G06F 11/22* (2006.01)
*G06F 12/14* (2006.01)
*G06F 15/177* (2006.01)
*G06F 9/00* (2006.01)

(52) U.S. Cl. .............................. 726/34; 713/2; 713/193
(58) Field of Classification Search ................ 708/135; 713/200, 2, 193; 726/34
See application file for complete search history.

(56) References Cited

U.S. PATENT DOCUMENTS

| | | | | |
|---|---|---|---|---|
| 4,975,950 | A * | 12/1990 | Lentz | 713/200 |
| 5,919,257 | A * | 7/1999 | Trostle | 713/200 |
| 5,944,821 | A * | 8/1999 | Angelo | 713/200 |
| 5,953,502 | A * | 9/1999 | Helbig, Sr. | 713/200 |
| 6,185,678 | B1 * | 2/2001 | Arbaugh et al. | 713/2 |
| 6,625,730 | B1 * | 9/2003 | Angelo et al. | 713/2 |
| 6,782,349 | B2 * | 8/2004 | Challener et al. | 702/186 |
| 6,938,164 | B1 * | 8/2005 | England et al. | 713/193 |
| 2002/0004905 | A1 * | 1/2002 | Davis et al. | 713/193 |
| 2002/0026576 | A1 * | 2/2002 | Das-Purkayastha et al. | 713/156 |
| 2002/0174353 | A1 * | 11/2002 | Lee | 713/193 |
| 2002/0194493 | A1 * | 12/2002 | Dalton | 713/200 |
| 2003/0056107 | A1 * | 3/2003 | Cammack et al. | 713/189 |
| 2003/0182561 | A1 * | 9/2003 | Challener et al. | 713/189 |
| 2003/0188179 | A1 * | 10/2003 | Challener et al. | 713/193 |
| 2003/0196110 | A1 * | 10/2003 | Lampson et al. | 713/200 |

FOREIGN PATENT DOCUMENTS

| | | |
|---|---|---|
| EP | 1056010 | 11/2000 |
| EP | 1085396 | 3/2001 |
| WO | WO-01/61473 | 8/2001 |

* cited by examiner

*Primary Examiner*—Gilberto Barron, Jr.
*Assistant Examiner*—Matthew Heneghan
(74) *Attorney, Agent, or Firm*—Schwegman, Lundberg, Woessner & Kluth, P.A.

(57) ABSTRACT

An apparatus may include a root of trust for measurement (RTM) module coupled to a verified platform security property policy module and a comparison module. The comparison module may operate to prevent transfer of control to an operating system (and/or halt the boot process) if a policy included in the platform security property policy module is violated. A system may include a memory coupled to a processor, a platform security property policy module, and a comparison module. The memory may include an RTM. A method may include beginning execution at an entry point within an RTM, determining that the RTM is trustworthy, determining that a main initialization code associated with a platform is trustworthy and transferring control to the main initialization code, and otherwise, refraining from transferring control to the main initialization code.

22 Claims, 4 Drawing Sheets

TRUSTED PLATFORM APPARATUS, SYSTEM, AND METHOD

RELATED APPLICATIONS

This application is related to co-pending application Ser. No. 09/751,899 titled "Platform and Method of Creating a Secure Boot That Enforces Proper User Authentication and Enforces Hardware Configurations", filed on Dec. 28, 2000 and commonly assigned to the assignee of the present invention.

TECHNICAL FIELD

The present invention relates generally to apparatus, systems, and methods providing security for computational platforms. More particularly, the present invention relates to apparatus, systems, and methods used to provide hardware and software authentication, as may occur in trusted computing platforms.

BACKGROUND INFORMATION

In a world increasingly influenced by the existence of networks connecting a widespread array of computing resources, the topics of data security, information protection, and user privacy have never been more important. Personal computers (PCs) typically offer an open architecture as an industry standard which can be used to build a ubiquitous computing platform. Trust in the platform, however, has not commonly been part of such designs. As used herein, the term "platform" can be taken to mean any type of device, including hardware, firmware, software, or any combination of these, whose activity is directed according to a plurality of programmed instructions.

Typically, platforms execute under the control of an Operating System (OS) when applications are to be executed. Operating Systems and pre-Operating System components are complex and require a loading (i.e., "boot") process to load them into the platform's memory. The platform loads the OS when the platform transitions from a power-off or suspend state to a power-on state, or when a reset signal is applied to the platform's reset line. Herein, the term "platform reset" may be used to refer to any of these conditions. The platform initialization code includes two components: the Platform Initialization Boot Block (PIBB) and the Main Platform Initialization Code (MPIC). After a platform reset occurs, the central processing unit (CPU) begins execution at a well known and defined location within the PIBB. This code is intentionally small, robust, and secure. The PIBB executes code to enable devices on the platform necessary for the Main Platform Initialization Code to execute. The PIBB then passes control of the platform to the Main Platform Initialization Code.

The Main Platform Initialization Code performs necessary functions to complete the initialization of the platform. Such functions may include initializing devices embedded within the platform, and locating and initializing optional plug-in or embedded adapters (having their own device initialization code). After this, the Main Platform Initialization Code locates the OS Loader and executes it. The OS Loader, in turn, loads the OS into memory and begins executing the OS. At this point, the platform is considered in the OS-present state and is fully under control of the loaded OS.

Whenever an untrusted platform loads an OS, violations of security policies can result without ever connecting the platform to a network. Thus, trusted computing is gaining importance in all aspects of computational operations, even when such operations are conducted apart from a network.

DETAILED DESCRIPTION OF THE EMBODIMENTS

Figure 1:
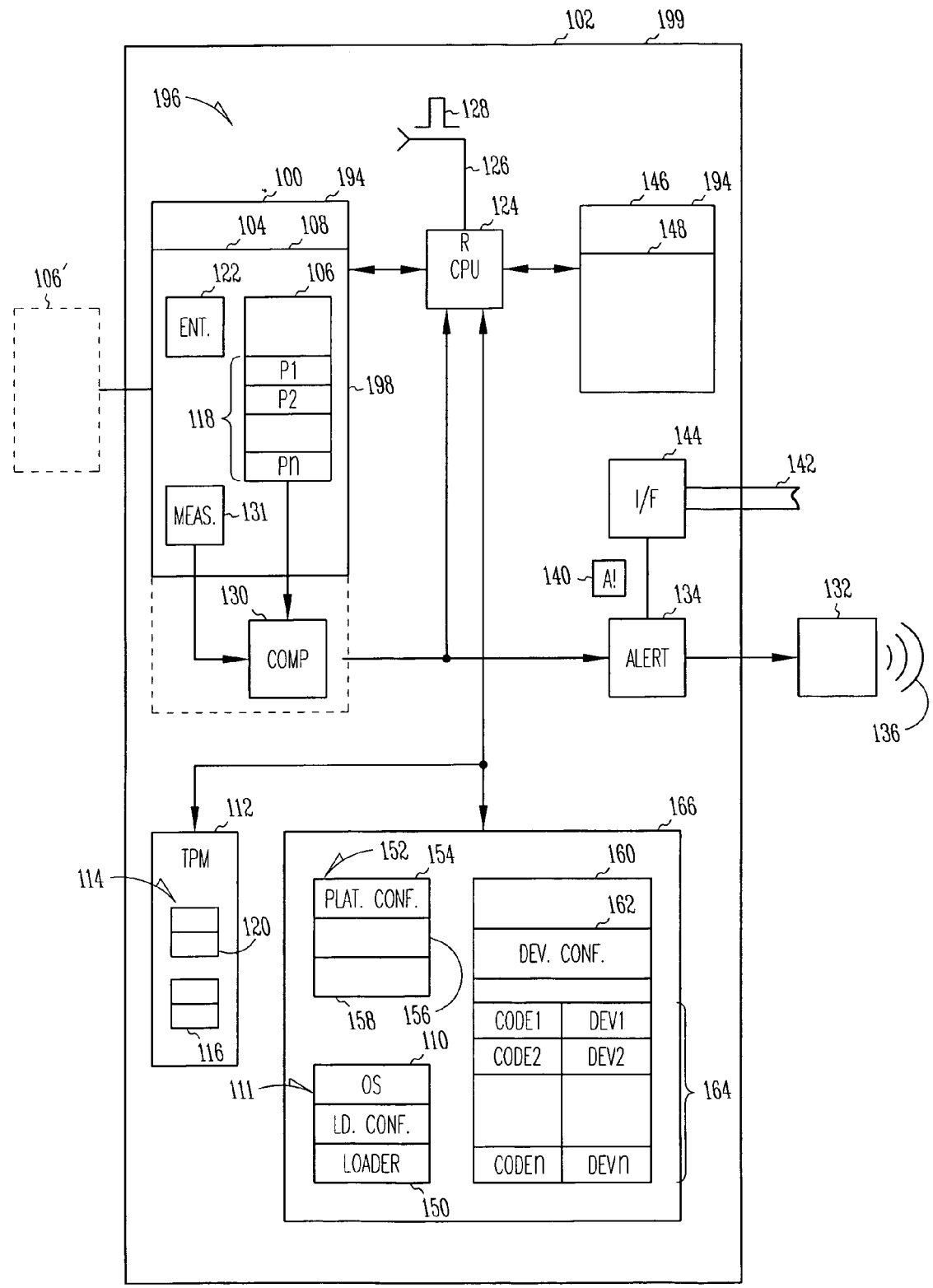
FIG. 1 is a block diagram of an apparatus, an article including a machine-accessible medium, and a system according to various embodiments of the invention.

In the following detailed description of various embodiments of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

Trust is established when a first entity (e.g., a program executing on behalf of a person or organization) acquires a basis to believe that the status, configuration and responses received from a second entity (e.g., a personal computer) are precisely as they are represented to the first entity. The Trusted Computing Platform Alliance (TCPA) has developed a standard to provide the industry with a set of operating conditions that enables trust in computing platforms and environments. This standard, "The TCPA Main Specification", version 1.1a, Nov. 12, 2001, can currently be found at www-trustedcomputing-org (to avoid inadvertent hyperlinks the periods in the preceding URL have been replaced by dashes). As an integral part of each platform, the TCPA Main Specification defines computing environment elements which operate to protect information within business and personal computing communications. Existing software-based security services are inadequate to provide proof that a platform is trusted. The TCPA Main Specification details mechanisms which, when implemented in a platform, will provide increased confidence and enable enhancements of existing services as well as the provision of new services.

The TCPA Main Specification also defines a set of components that can be trusted to operate as expected. When embedded in a platform, these components will reliably measure and report information about the environment in that platform. This "integrity check" feature of the components complements and enhances software-only security services. The components include an isolated computing engine whose processes can be trusted because they cannot be altered. These trusted processes include protected storage, digital signature, and Public Key Infrastructure (PKI) data exchange.

The proposed behavior for a TCPA enabled device, a Trusted Platform Module (TPM), is to "report" the integrity of the platform, allowing the platform to boot to the OS even with untrusted components installed. This allows an external resource (e.g., a server on a network) to determine the trustworthiness of the platform but does not prevent access to the platform by the user.

FIG. 1 is a block diagram of an apparatus, an article including a machine-accessible medium, and a system according to various embodiments of the invention. In one embodiment of the invention, an apparatus 100 for providing trust in a platform 102 may include a root of trust for measurement (RTM) module 104 and a platform security property policy module 106, 106'. The RTM 104 establishes the basis for trust in the platform 102. Thus, the platform user must first decide to trust the platform's RTM 102. Once that decision has been made, the apparatus 100 described herein can be used to provide a basis for trust in the remaining portions of the boot process.

As described herein, it is assumed that an unauthorized entity will not be able to modify the PIBB 108, which may be the RTM 104. It can also be assumed that all other components and/or modules within the platform 102 are subject to attack or modification, intentional or otherwise. Thus, various embodiments of the invention may act to prevent loading the OS 110 (typically included in a memory 111 or other storage device) within the platform 102, and may alert the platform user, if unauthorized modification to the platform's components occurs.

The TCPA Main Specification defines a set of trusted functions and shielded storage locations. These functions and storage locations are contained in a Trusted Platform Module (TPM) 112 that is typically, but not necessarily, embodied as a device permanently attached to the platform 102.

Examples of shielded storage locations include Data Integrity Registers (DIR) 114, non-volatile registers that can only be modified by the platform owner, and Platform Configuration Registers (PCRs) 116 that contain values that measure the integrity of the platform 102. Part of the TCPA Main Specification defines hashing the value of targets and placing the hashed values into a shielded storage location, possibly combining the hashed values with previously-stored values. Such targets may include executable code, configuration data, a log of TCPA-defined information, and other items.

The platform security property policy module 106, possibly including information in the form of a policy table 118, may be included in the PIBB 108. The policy table 118 typically contains information that affects the operations of the platform during the boot process.

As described herein, one of the DIRs 114 is the policy table DIR 120. The policy table DIR 120 (included in the TPM 112) contains information placed by the platform owner, or an authorized agent, to validate the PIBB 108 and by extension, the policy table 118. Thus, trust in the PIBB 108 and the policy module 106, 106' is established by measuring and comparing against a pre-loaded value placed into the policy table DIR 120 by an authorized, trusted entity (i.e., the policy module 106, 106' must be verified). The policy table 118 contains policies to which the platform 102 must adhere during the initialization/boot process.

Measurement is the action of obtaining a value that can be directly associated with the integrity of the entity. An example is calculating the hash value of a large byte stream, or for small values, the value itself may be used directly. Verification is comparing the measured value against a known, trusted value. Thus, as defined herein, "measuring" means to gather data about a component, optionally entering the gathered information into a log (which may be in an untrusted location), optionally hashing the gathered data values, and/or the logged values, and storing the data/hashed data into one of the PCRs 116. "Comparing measurements" means comparing values in the policy table with the hashed or extended data from a PCR 116, or the log.

As noted above, the RTM module 104 may be a PIBB 108 associated with the platform 102, which includes an entry point 122. Assuming a processor 124 within the platform 102 is coupled to a reset line 126, the processor 124 will typically operate to begin execution at the entry point 122 upon receiving a reset signal 128 on the reset line 126 (i.e., a platform reset condition).

A comparison module 130 may be communicatively coupled to, and located within, the RTM module 104, the platform security property policy module 106, and various internal measurement functions 131. The comparison module 130 may operate to prevent transfer of control to the OS 110, and/or even to prevent the remainder of the boot process, if a policy P1–Pn included in the verified platform security property policy module 106 is violated. In addition, if at any time during initialization of the platform 102 a component within the platform 102 violates a policy in the verified platform security property policy module 106, as detected by the comparison module 130, for example, the platform 102 may operate to alert the platform user (and/or possibly other devices via, for example, a network connection) that the platform 102 attempted to initialize using an invalid component.

Thus, the apparatus 100 may include an alert device 132 communicatively coupled to the processor 124, possibly using an alert device module 134. The alert device 132 may be actuated by the processor 124 to provide an alert signal 136 when a policy P1–Pn included in the platform security property policy module 104 is violated. The alert device 132 may be a hardware mechanism used to alert the platform user that the platform has failed to complete the boot sequence due to non-conformance with one or more defined security policies P1–Pn. The alert signal 136 may be a simple audible tone or sequence of tones, a light or flashes of light, tactile pulsations, remote messaging, etc. In addition, an alert or other message 140 may be sent, possibly using the alert device module 134 coupled to the comparison module 130, to another device across a network 142, usually by way of a network interface 144. After actuating the alert device 132, the platform 102 may enter a state requiring a platform reset condition (e.g., typically a hardware reset, described above) to continue.

The apparatus 100 may also have a memory 146 including an MPIC 148 associated with the platform 102. The memory 146 may be communicatively coupled to the platform 102, and the platform 102 may be communicatively coupled to the RTM module 104.

Prior to transferring control to the next part of the platform's initialization sequence, authorization must be obtained from the policy table 118. The policy table 118 can include raw hash values, extended PCR values, or identifiers to validation credentials. An identifier can be a pointer to a memory location, an index value, or any unique number that can be searched.

Finally, before transferring control of the platform 102 to the OS Loader 150, the Main Platform Initialization Code 148 compares the overall configuration and load sequence of the platform 102 by checking the policy table 118 to determine that: there is a required set of components contained within the platform 102, the platform 102 doesn't contain disallowed components, and/or that a specified set of components have been loaded in a particular sequence. Thus, the platform 102 may include a memory 152 or other storage device which includes the platform configuration 154, as well as a platform endorsement credential 156, and a platform conformance credential 158.

The TCPA also provides for several different types of credentials, including an Endorsement Credential, a Platform Credential, and a Validation Credential. The Endorsement Credential provides assurance that the platform contains a valid TPM. The Platform Credential provides assurance that the TPM is properly bound to the Platform. And the Validation Credential provides assurance that a device or Device Initialization Code is from the manufacturer named in the credential. The platform security property policy module 106 (and/or the policy table 118) may also include an Endorsement Credential, a Platform Conformance Credential, validations of these (e.g., a hash of the credentials) if they are external to the platform security property policy module 106, and/or a mandatory set of sequenced components.

The platform 102 may also include a memory 160 or other storage device which includes one or more device configurations 162 associated with one or more devices DEV1–DEVn and their respective Device Initialization Codes CODE1–CODEn 164. The memories 111, 152, and 160 may be contiguous, and contained within a single larger memory 166, or the memories 111, 152, 160 may exist as part of components or devices physically separated from the platform 102.

Figure 2:
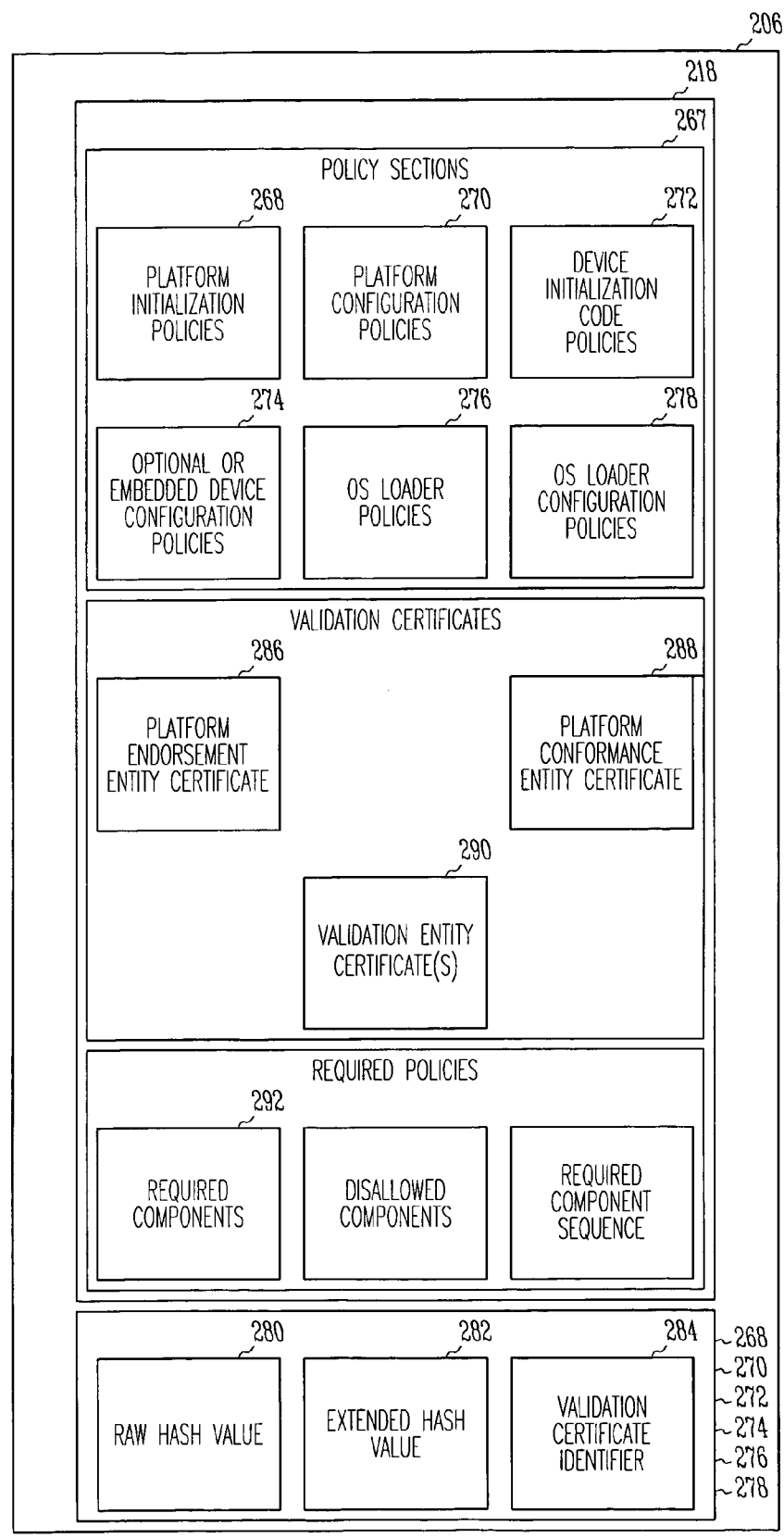
FIG. 2 is a block diagram of a policy module according to an embodiment of the invention.

FIG. 2 is a block diagram of a policy module 206 according to an embodiment of the invention. As noted above, the policy table 218 included in the policy module 206 may be used to define the security properties of the platform, using one or more policies contained therein. Typically, the policy table 218 resides within the PIBB. Alternatively, the policy table 218 may reside outside the PIBB (see the location of module 106' in FIG. 1), but its measured value must be included with that of the PIBB when compared with the Policy Table DIR.

The policy table 218 may include several entries, typically grouped into policy sections 267, that define the security properties of the platform, such as: platform initialization code policies 268, platform configuration policies 270, device and device initialization code policies 272, optional or embedded device configuration policies 274, OS loader policies 276, OS Loader configuration policies 278 and other security-related rules and definitions. Each of the sections 267 may also include none, some, or all of the following: raw hashed policy values 280, extended policy values 282, validation credential identifiers 284, values identifying the Platform Endorsement Credential 286, values identifying the Platform Conformance Credential 288, and/or values identifying Validation Credentials 290.

Each entry typically includes a flag indicating the required policy for that section. For example, the section may contain only raw hashed values to be used to verify policy or it may contain only identifiers to validation credentials indicating that only components that have validation credentials are allowed for that particular section.

Verifying that a component or platform element/module satisfies the defined policies occurs by comparing measurements of the element/module with the appropriate policy table entry. There may be multiple entries pertaining to a single component or module in the policy table 218. None, some, or all entries may be required to match in order for that component or module to satisfy a defined policy. For example, a policy 274 for a required component 292 may include checking the raw hashed value 280, checking the extended hash values 282, validating at least one of the component's credentials 290, and then comparing the raw hashed value 280 with the specified values within the credential 290. If a component 292 fails to satisfy the associated policy 274, the entity that checked the component 292 may transfer control of the platform to the alert device module.

Referring back to FIG. 1, it is now easily understood that a platform 102 may include one or more of the following components: a processor 124, platform initialization code 194 (having a PIBB 108 and Main Platform Initialization Code 148), and various devices, such as embedded and/or optional devices DEV1–DEVn within the platform 102 which may contain their own respective device initialization codes CODE1–CODEn. The platform 102 typically also includes a device which includes or has the ability to access the OS loader 150, and a device which includes or has the ability to access the OS 110.

Thus, in another embodiment of the invention, a system 196 may include a processor 124 coupled to a memory 198. The memory 198 may include an RTM 104 module, a platform security property policy module 106 (capable of being communicatively coupled to the memory 198), and a comparison module 130 (capable of being communicatively coupled to the memory 198). Thus, the memory 198 may include an initialization boot block, such as a PIBB 108. Typically, the comparison module 130 operates to prevent transfer of control to the operating system 110 or other pre-OS components (e.g., completely halting the boot process) when a policy included in the platform security property policy module 106 is violated. This may occur, for example, when measuring and comparing (i.e., verifying) the platform security policy module 106 against the value in the policy table DIR 120 included in the TPM 112 fails. In this embodiment, the comparison module 130 should be verified before it is trusted to make valid comparisons.

Still referring to FIG. 1, the system 196 may also include a reset line 126 coupled to the processor 124, wherein an entry point 122 included in the RTM 104 is executed by the processor 124 when a reset signal 128 is applied to the reset line 126 to initiate a Platform Reset condition. Finally, it should be noted that the system 196 may also include an alert device 132 communicatively coupled to the processor 124, wherein the alert device 132 may be actuated by the processor 124 so as to provide an alert signal 136 when a policy included in the verified platform security property policy module 106 is violated.

Referring now to both FIGS. 1 and 2, the apparatus 100; RTM module 104; platform security property policy modules 106, 106', 206 (including each of the various elements within them); PIBB 108; TPM 112; DIRs 114; PCRs 116; policy tables 118, 218; processor 124; comparison module 130; internal measurement functions 131; alert device 132; alert device module 134; network interface 144; and the memories 111, 146, 152, 160, 166, 198 may all be characterized as "modules" herein. Such modules may include hardware circuitry, and/or a microprocessor and/or memory circuits, software program modules, and/or firmware, and combinations thereof, as desired by the architect of the apparatus 100 and system 196, and appropriate for particular embodiments of the invention.

One of ordinary skill in the art will understand that the apparatus and systems of the present invention can be used in applications other than for personal computers, and in applications other than for networks which include personal computers, and thus, the invention is not to be so limited. The illustrations of an apparatus 100 and a system 196 are intended to provide a general understanding of the structure of the present invention, and they are not intended to serve as a complete description of all the elements and features of apparatus and systems which might make use of the structures described herein.

Applications which may include the novel apparatus and system of the present invention include electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, cellular telephones, personal computers, radios, vehicles, and others.

Figure 3A:
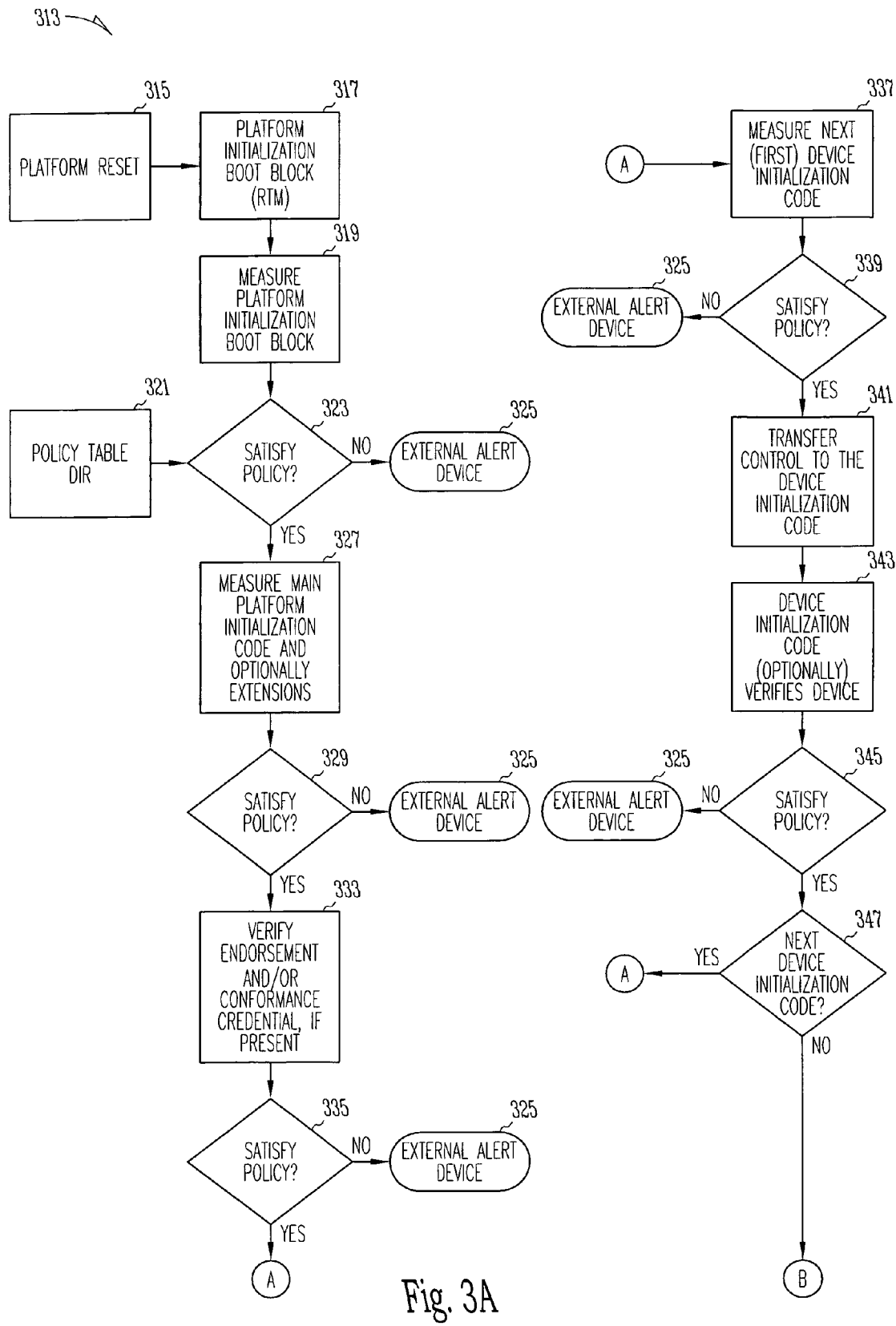
FIGS. 3A and 3B are flow diagrams illustrating a method of verifying trust in a platform according to an embodiment of the invention.
Figure 3B:
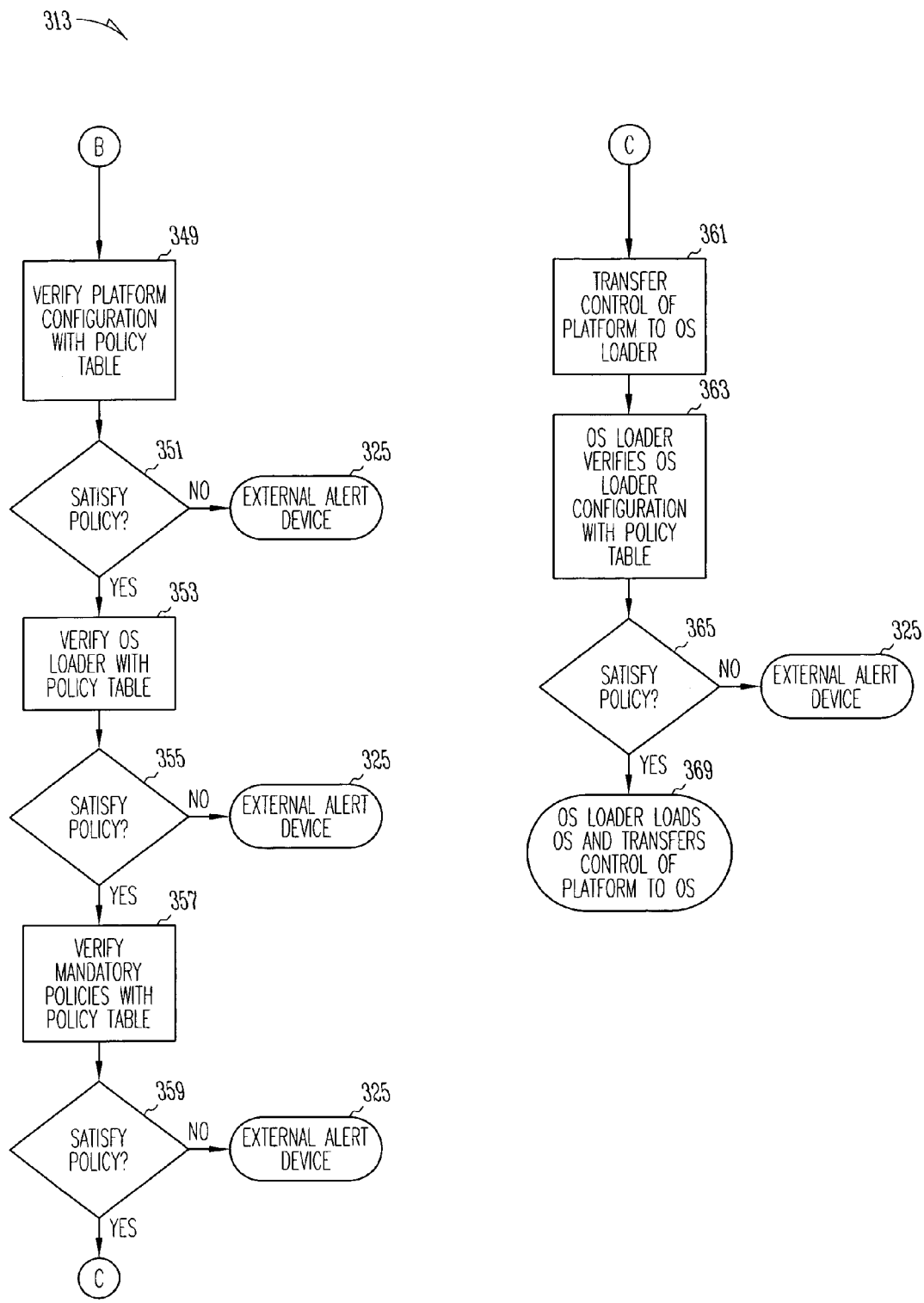

FIGS. 3A and 3B are flow diagrams illustrating a method of verifying trust in a platform according to an embodiment of the invention. The method 313 may begin in FIG. 3A at block 315 when a Platform Reset condition is sensed by a processor or other module within the platform. The processor may then begin execution of the entry point code at block 317.

The PIBB contains its own code to perform measurements (i.e., the internal measurement functions) because all other components at this time are untrusted. The PIBB, using this internal code, measures itself at block 319 and verifies that it satisfies policy according to the policy table DIR within the TPM at block 321 and 323. If the measurement does not satisfy the policy, then control is typically turned over to the alert device module and/or the alert device, and the platform user is alerted at block 325. Optionally, the TPM may be disabled so that the platform behaves as an untrusted platform, but the boot process is allowed to continue. If the measurement satisfies the policy, then the policy table can be trusted, and the method 313 may continue with block 327.

Various embodiments of the invention disclosed herein involve using the PIBB to measure the Main Platform Initialization Code at block 327, and verify that it satisfies the policy at block 329. Still referring to block 327, if there are extensions to the Main Platform Initialization Code, the PIBB also measures the extensions and verifies that they satisfy the policy. If the measurement results do not satisfy the policy at block 329, then control is typically turned over to the alert device module and/or the alert device, and the platform user is alerted at block 325.

If the platform contains a Platform, Conformance, or endorsement credential(s), they are verified with the respective entries within the policy table at block 333. If the credentials do not verify, the platform does not satisfy policy. If the measurement does not satisfy the policy at block 335, then control is typically turned over to the alert device module and/or the alert device, and the platform user is alerted at block 325.

The Main Platform Initialization Code may be used to examine the platform for optional or embedded devices and their device initialization codes. However, before transferring control from the Main Platform Initialization Code to any device initialization code, the Main Platform Initialization Code should verify that the device and its device initialization code satisfies the policy at blocks 337 and 339. If the measurement does not satisfy the policy at block 339, then control is typically turned over to the alert device module and/or the alert device, and the platform user is alerted at block 325.

Device initialization codes may validate the configuration of their associated devices. In this case, control may be transferred to the device initialization code at block 341. For each device, if there is an entry in the policy table related to a selected device, the device initialization code associated with that device may verify that the configuration of the associated device satisfies the policy at block 343, including any hidden components of the associated device. If the measurement does not satisfy the policy at block 345, then control is typically turned over to the alert device module and/or the alert device, and the platform user is alerted at block 325. If it is determined that another policy table entry and associated device initialization code exist at block 347, then the code may be measured at block 337, and the process outlined by blocks 339, 341, 343, 345, and 347 can be repeated any number of times.

After all the device initialization codes have been executed and all devices have been initialized, the method 313 may continue on FIG. 3B at block 349, where the Main Platform Initialization Code may be used to gather information regarding the platform's configuration and verify that it satisfies policy at block 351. If the measurement does not satisfy the policy at block 351, then control is typically turned over to the alert device module and/or the alert device, and the platform user is alerted at block 325.

Upon completion of all Main Platform Initialization Code functions, the Main Platform Initialization Code may locate the OS loader and verify that the OS loader satisfies policy at blocks 353 and 355. If the measurement does not satisfy the policy at block 355, then control is typically turned over to the alert device module and/or the alert device, and the platform user is alerted at block 325.

Prior to transferring control to the OS loader, the Main Platform Initialization Code may check the policy table for required, disallowed, and/or mandatory sets of sequenced components at block 357. The policy may require the presence of particular components; it may disallow particular components; or it may require a particular sequence of components. If any of the required conditions are not met, the platform does not satisfy policy at block 359, and control is typically turned over to the alert device module and/or the alert device, and the platform user is alerted at block 325.

If the policy is satisfied at block 359, control is transferred to the OS loader at block 361. If the OS loader allows options, the OS loader may operate to verify that those options satisfy the policy at blocks 363 and 365. If the measurement does not satisfy the policy at block 365, then control is typically turned over to the alert device module and/or the alert device, and the platform user is alerted at block 325. If the policy is satisfied at block 365, then the OS loader is allowed to load the OS, and control of the platform is transferred to the OS at block 369. At this point, the method 313 ends.

In summary, the method 313 may include sensing a platform reset condition, beginning execution at an entry point within a root of trust for measurement (RTM), and determining that the RTM is trustworthy, which may include determining that a platform security property policy module associated with the RTM is trustworthy. Determining that the platform security property policy module associated with the RTM is trustworthy may include measuring a policy table and comparing the measurements with one or more values included in a DIR (included in a TPM).

The method may continue with determining that a main initialization code associated with a platform is trustworthy, and transferring control to the main initialization code. Otherwise, the method may operate by determining that a main initialization code associated with a platform is not trustworthy, and it may refrain from transferring control to the main initialization code. In addition, the method may operate by refraining from loading an operating system associated with the platform if a policy associated with the RTM is violated.

The method may also include determining that a platform configuration does not violate a policy associated with the RTM, determining that a device does not violate a policy associated with the RTM, determining that a device initialization code associated with the device does not violate a policy associated with the RTM, and transferring control to the device initialization code.

The method may also include determining that an operating system loader associated with the platform does not violate a policy associated with the RTM, determining that a selected group of components is present, and transferring control to an operating system loader associated with the platform. The method may also include determining that a selected group of disallowed components is not present, and transferring control to an operating system loader associated with the platform.

Thus, referring back to FIG. 1, it is now easily understood that another embodiment of the invention may include an article 199, such as a computer, a memory system, a magnetic or optical disk, some other storage device, and/or any type of electronic device or system, comprising a machine-accessible medium 194 (e.g., a memory including an electrical, optical, or electromagnetic conductor) having associated data 108 (e.g. computer program instructions), which when accessed, results in a machine performing such actions as beginning execution at an entry point within a root of trust for measurement (RTM), determining that the RTM is trustworthy, determining that a main initialization code associated with a platform is trustworthy and transferring control to the main initialization code, and otherwise determining that a main initialization code associated with a platform is not trustworthy and refraining from transferring control to the main initialization code.

Other actions may include determining that a platform configuration does not violate a policy associated with the RTM, determining that an operating system loader associated with the platform does not violate a policy associated with the RTM, determining that a selected group of components is present, and transferring control to an operating system loader associated with the platform. Similarly, determining that a selected group of disallowed components is not present, and transferring control to an operating system loader associated with the platform may also be included within the scope of such activities.

Although specific embodiments have been illustrated and described herein, those of ordinary skill in the art will appreciate that any arrangement which is calculated to achieve the same purpose may be substituted for the specific embodiments shown. This disclosure is intended to cover any and all adaptations or variations of various embodiments of the present invention. It is to be understood that the above description has been made in an illustrative fashion, and not in a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Description of Embodiments of the Invention, with each claim standing on its own as a separate preferred embodiment.

What is claimed is:

1. An apparatus, comprising:
   a processor capable of executing instructions within one or more modules;
   a self-measuring root of trust for measurement (RTM) module;
   a platform security property policy module capable of verifying itself and subsequently-activated components, and of being communicatively coupled to the self-measuring RTM module; and
   a comparison module capable of being communicatively coupled to the self-measuring RTM module, the comparison module to prevent transfer of control to an operating system if a policy included in the platform security property policy module is violated.

2. The apparatus of claim 1, wherein the self-measuring RTM module comprises an initialization boot block associated with a platform.

3. The apparatus of claim 2, wherein the initialization boot block includes an entry point capable of being executed by the processor upon reception of a reset signal on a reset line coupled to the processor so as to initiate a platform reset condition.

4. The apparatus of claim 1, further comprising:
   a memory including a main initialization code associated with a platform, wherein the memory is communicatively coupled to the platform, and wherein the platform is communicatively coupled to the self-measuring RTM module.

5. The apparatus of claim 1, further comprising:
   a trusted platform module (TPM) including a value associated with the platform security property policy module stored in a shielded storage location.

6. The apparatus of claim 1, further comprising:
   platform credentials included in the platform security property policy module.

7. The apparatus of claim 1, further comprising:
   a mandatory set of sequenced components included in the platform security property policy module.

8. A system, comprising:
   a memory including a self-measuring root of trust for measurement (RTM) module;
   a platform security property policy module capable of verifying itself and subsequently-activated components, and of being communicatively coupled to the memory;

a comparison module capable of being communicatively coupled to the memory, the comparison module to prevent transfer of control to an operating system when a policy included in the platform security property policy module is violated;

a processor capable of being communicatively coupled to the memory; and a network interface to couple to the processor.

9. The system of claim 8, further comprising:

a reset line communicatively coupled to the processor, wherein an entry point included in the self-measuring RTM module is to be executed by the processor when a reset signal is applied to the reset line so as to initiate a platform reset condition.

10. The system of claim 8, further comprising:

a trusted platform module (TPM) including a value associated with the platform security property policy module and stored in a shielded storage location.

11. The system of claim 8, further comprising:

an alert device communicatively coupled to the processor, wherein the alert device is to be actuated by the processor so as to provide an alert signal when a policy included in the platform security property policy module is violated.

12. A method, comprising:

beginning execution at an entry point within a self-measuring root of trust for measurement (RTM);

determining that the self-measuring RTM is trustworthy;

activating a platform security property policy module to couple to the self-measuring RTM, to verify the platform security property policy module, and to verify subsequently-activated components;

determining that a main initialization code associated with a platform is trustworthy and transferring control to the main initialization code; and otherwise determining that a main initialization code associated with a platform is not trustworthy and refraining from transferring control to the main initialization code.

13. The method of claim 12, further comprising:

sensing a platform reset condition.

14. The method of claim 12, further comprising:

refraining from loading an operating system (OS) or other pre-OS components associated with the platform if a policy associated with the self-measuring RTM is violated.

15. The method of claim 12, wherein the self-measuring RTM comprises an initialization boot block associated with the platform.

16. The method of claim 12, wherein determining that the self-measuring RTM is trustworthy further comprises:

determining that a policy table associated with the self-measuring RTM is trustworthy by measuring the policy table to provide a measurement and comparing the measurement with a value stored in a shielded storage location within a trusted platform module.

17. The method of claim 12, further comprising:

determining that a device does not violate a policy associated with the self-measuring RTM;

determining that a device initialization code associated with the device does not violate a policy associated with the self-measuring RTM; and transferring control to the device initialization code.

18. An article comprising a machine-accessible medium having associated data, wherein the data, when accessed, results in a machine performing:

beginning execution at an entry point within a self-measuring root of trust for measurement (RTM);

determining that the self-measuring RTM is trustworthy;

activating a platform security property policy module to couple to the self-measuring RTM, to verify the platform security property policy module, and to verify subsequently-activated components;

determining that a main initialization code associated with a platform is trustworthy and transferring control to the main initialization code; and otherwise determining that a main initialization code associated with a platform is not trustworthy and refraining from transferring control to the main initialization code.

19. The article of claim 18, wherein the machine-accessible medium further includes data, which when accessed by the machine, results in the machine performing:

determining that a platform configuration does not violate a policy associated with the self-measuring RTM.

20. The article of claim 18, wherein the machine-accessible medium further includes data, which when accessed by the machine, results in the machine performing:

determining that an operating system loader associated with the platform does not violate a policy associated with the self-measuring RTM.

21. The article of claim 18, wherein the machine-accessible medium further includes data, which when accessed by the machine, results in the machine performing:

determining that a selected group of components is present; and transferring control to an operating system loader associated with the platform.

22. The article of claim 18, wherein the machine-accessible medium further includes data, which when accessed by the machine, results in the machine performing:

determining that a selected group of disallowed components is not present; and transferring control to an operating system loader associated with the platform.

* * * * *